(12) United States Patent
Kaneko

(10) Patent No.: US 6,289,927 B1
(45) Date of Patent: Sep. 18, 2001

(54) PRESSURE CONTROL VALVE (75) Inventor: Tsutomu Kaneko, Takasaki (JP)

(73) Assignee: Furukawa Co., Ltd., Tokyo (JP)

( * ) Notice: Subject to any disclaimer, the term of this patent is extended or adjusted under 35 U.S.C. 154(b) by 0 days.

(21) Appl. No.: 09/512,720

(22) Filed: Feb. 24, 2000

(30) Foreign Application Priority Data

Feb. 26, 1999 (JP) .................................................. 11-051195

(51) Int. Cl.$^7$ ................................................. F16K 17/06
(52) U.S. Cl. ........................ 137/529; 137/522; 137/540
(58) Field of Search .................................. 137/522, 529, 137/540

(56) References Cited

U.S. PATENT DOCUMENTS

| | | | |
|---|---|---|---|
| 2,742,054 | * | 4/1956 | Poundstone ........................ 137/522 |
| 2,944,564 | * | 7/1960 | Pettey .................................. 137/529 |
| 3,713,295 | | 1/1973 | Haak et al. . |
| 3,923,075 | | 12/1975 | Farrell ................................ 137/491 |
| 4,463,929 | | 8/1984 | Dantlgraber et al. . |
| 5,234,028 | * | 8/1993 | Takano et al. ...................... 137/529 |

FOREIGN PATENT DOCUMENTS 2184814A 7/1987 (GB) .

* cited by examiner

*Primary Examiner*—Gerald A. Michalsky
(74) *Attorney, Agent, or Firm*—Young & Basile, P.C.

(57) ABSTRACT

This invention provides a pressure control valve 20 including a valve plug 30 facing a seat As at a relief port A that communicates with a pressure circuit 46, and a spring 32 pressing the valve plug 30 against the seat, and when the fluid pressure in the pressure circuit surpasses the force of the spring 32 for the valve plug, the pressure control valve discharges part of the fluid to keep the interior of the pressure circuit at a specified setting pressure. In the pressure control valve, at one end of the spring for the valve plug which is remote from the valve plug there is provided a pilot piston 40 freely movable in the expansion and compression direction of the spring for the valve plug. There is also provided a spring for adjustment 38*c* urging the pilot piston 40 toward the valve plug side. The pilot piston 40 is so structured as to move in a direction of going away from the valve plug when supplied with a pilot fluid under a specified pressure $P_{pi}$.

1 Claim, 7 Drawing Sheets

PRESSURE CONTROL VALVE

BACKGROUND OF THE INVENTION

1. Field of the Invention

The present invention relates to a pressure control valve for keeping the interior of a pressure circuit at a specified setting pressure.

2. Description of the Related Art

Figure 6:
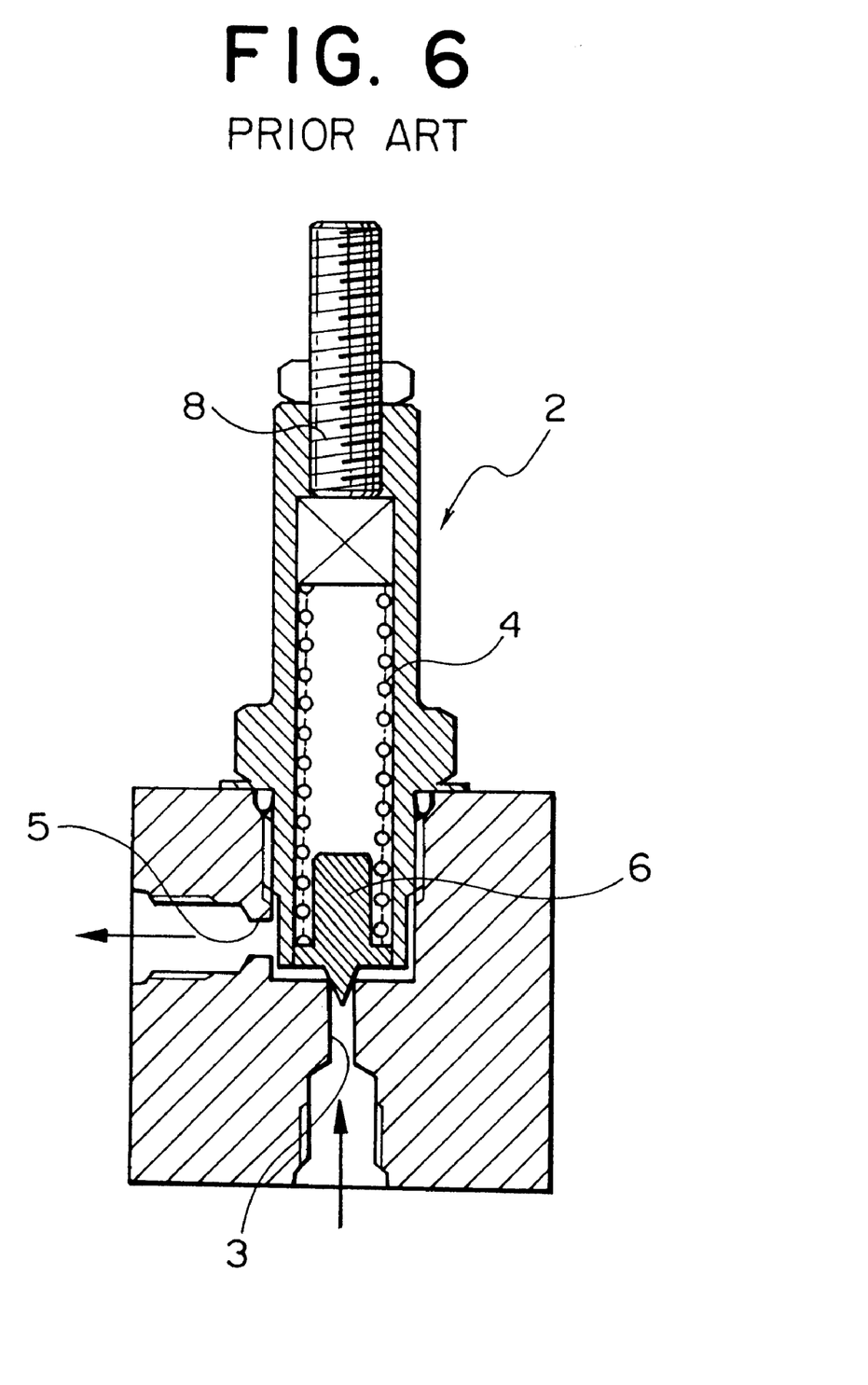
FIG. 6 is a diagram showing a direct-operated relief valve.

As a pressure control valve for keeping the interior of a pressure circuit at a specified setting pressure, a direct-operated relief valve 2, for example, is known which is illustrated in FIG. 6.

The direct-operated relief valve 2 keeps a relief port 3, which is open to the pressure circuit, closed with a valve plug 6 which is pressed by a pressure adjusting spring 4 against the relief port 3. When the pressure in the pressure circuit rises above a specified setting pressure, the valve plug 6 is pushed up and the relief port 3 communicates with the pressure circuit and part of the fluid flows out of the pressure circuit into the drain port, so that the pressure circuit can be held at a specified setting pressure. Note that the setting pressure is adjusted by changing the pressure of the spring by turning the adjust screw 8.

In the direct-operated relief valve 2, the pressure adjusting spring 4 also presses the valve plug 6 and therefore it is necessary to use a strong spring for the pressure adjusting spring 4 when the direct-operated relief valve 2 is used in a pressure circuit at high pressure. However, the use of a large, strong spring makes the relief valve itself large and there is a limit to the strength of the spring used. For this reason, normally, a pilot-operated relief valve 10 shown in FIG. 7 is adopted in pressure circuits for high pressures.

Figure 7:
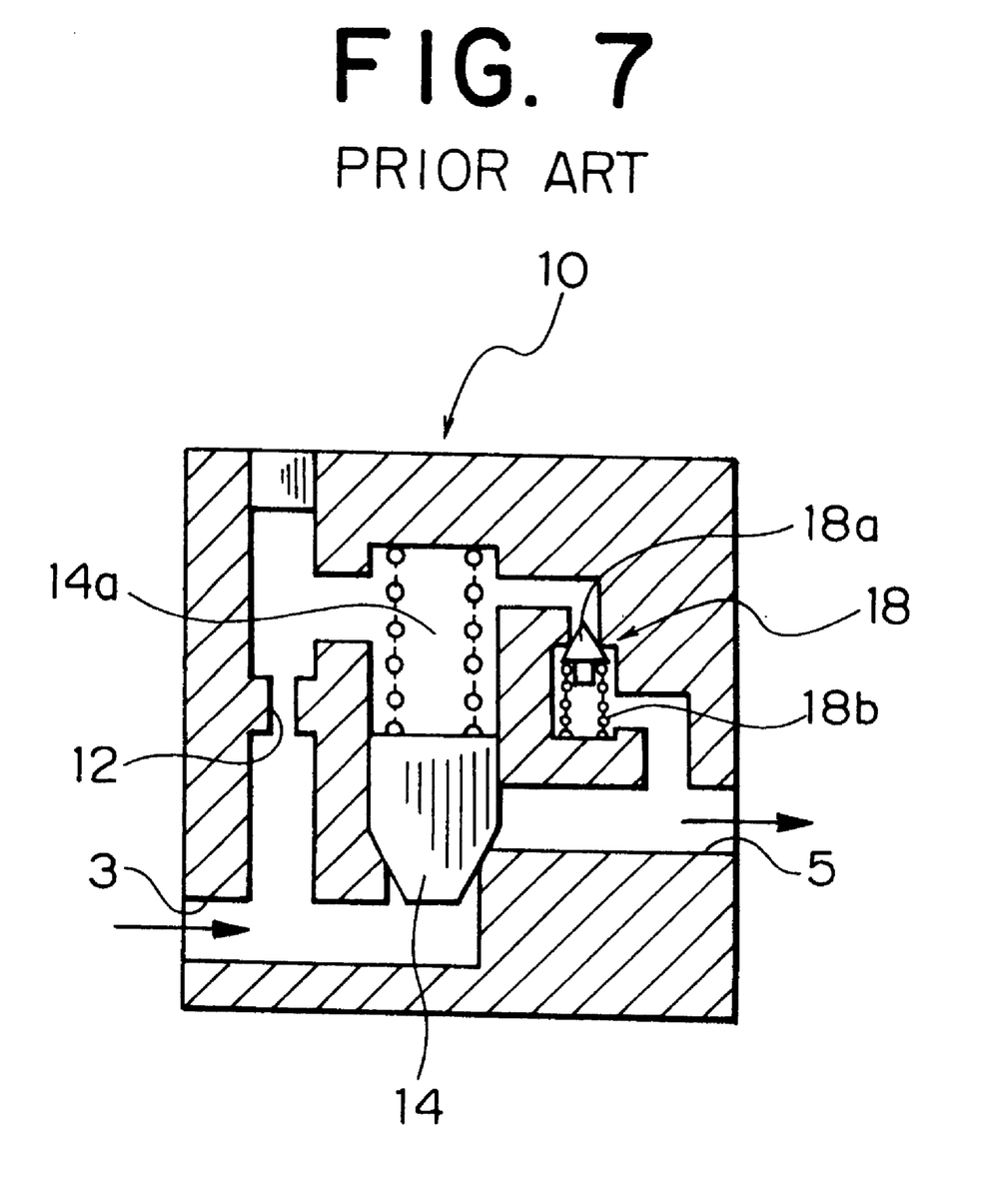
FIG. 7 is a diagram showing a pilot-operated relief valve.

The pilot-operated relief valve 10 is structured such that the relief port 3 communicates through a throttle 12 with an upper chamber 14a of a main valve 14 and also with a direct-operated relief valve 18 that constitutes a pilot section as illustrated in FIG. 7. When the pressure of the pressure circuit rises above a specified setting pressure and surpasses the pressure of the spring 18b, the valve plug 18a goes down and the direct-operated relief valve 18 opens. Consequently, the upper chamber 14a communicates with the drain port 5, the pressure of the upper chamber 14a decreases, with the result that the main valve 14 opens and the fluid of the pressure circuit flows to the side of the drain port 5. Thus, the pressure circuit at high pressure can be kept at the specified setting pressure.

For use as an alternate pilot section to replace the direct-operated relief valve 18 of the pilot-operated relief valve 10 shown in FIG. 7, if a proportional electromagnetic pressure control section for controlling the pressure of the upper chamber 14a by an electric pilot signal is incorporated, it is possible to implement automatic control of the setting pressure of the pressure circuit within a specified range.

However, if the proportional electromagnetic pressure control section mentioned above is used, there is a possibility that the resultant pressure control valve is a type of a complicated internal structure, which increases production cost and poses a problem of safety, such as a fire caused by the use of electricity.

The present invention has been made with the above problem in mind and has as its object to provide a pressure control valve capable of stepless automatic control of the setting value of a pressure circuit, which is made possible by the adoption of a pilot-operated simple-structure without use of electric signals.

SUMMARY OF THE INVENTION

The pressure control valve of the present invention comprises a valve plug placed against a valve seat at a relief port connected to a pressure circuit; and a spring for the valve plug to press the valve plug against the valve seat, the pressure control valve being capable of keeping the interior of the pressure circuit at a specified setting pressure by discharging part of the fluid when the fluid pressure in the pressure circuit surpasses the force of the spring for the valve plug, wherein the force of the spring for the valve plug is increased or decreased by the movement of a pilot piston according to an increase or decrease in the pressure of a pilot liquid, the pilot piston freely movable in the direction of expansion and compression of the spring for the valve plug being disposed at one end of the spring for the valve plug away from the valve plug, the pilot piston being provided with an adjusting spring at the other end of the pilot piston opposite the one end where there is the spring for the valve plug, and the pilot piston being so structured as to move in a direction of going away from the valve plug when the pilot piston receives a pilot fluid at a specified pressure.

According to the pressure control valve when there is no influx of the pilot fluid, the valve plug is being pressed against the valve seat by the spring for the valve plug and the adjusting spring and therefore the interior of the pressure circuit is held at a specified setting pressure. When the pressure of the pressure circuit rises above the setting pressure and surmounts the force of the spring for the valve plug, the valve plug recedes to open the relief port and allow the fluid from the pressure circuit to enter and flow out of the drain port. And, when the pressure of the pressure circuit goes down and reaches the setting pressure, the valve plug is brought into contact with the valve seat at the relief port by the force of the spring for the valve plug and the interior of the pressure circuit is held at the setting pressure.

Because, when the pilot fluid flows in, the pilot piston moves in the direction of going away from the valve plug, the spring for the valve plug is increased in length and the pressure of the spring is decreased. As the pressure of the spring for the valve plug is decreased, the force pressing the valve plug against the valve seat decreases, and thus the pressure control valve works as a pressure control valve with a lower setting pressure.

The pressure control valve further comprises a first piston movement limiting means for preventing the pilot piston, which has moved to a position closer to the valve plug, from moving the pilot piston beyond the above-mentioned closer position on the side of the valve plug even if the pressing force of the adjusting spring is increased. The pilot piston does not move in the direction of going away from the valve plug before the pressure of the pilot fluid rises to a specified value and a fixed large spring force presses the valve plug against the valve seat. Therefore, this pressure control valve can be used as a pressure control valve with an upper limit of setting pressure.

The pressure control valve furthermore comprises a second piston movement limiting means for preventing the pilot piston, which has moved to a position remote from the valve plug, from moving to a remoter position beyond the above-mentioned remote position even if the pressing force of the adjusting spring is decreased. When the pressure of the pilot fluid rises above a specified value, a fixed small spring force of the spring for the valve plug presses the valve plug against the valve seat. Therefore, this pressure control valve can be used as a pressure control valve with a lower limit of setting pressure.

DESCRIPTION OF THE PREFERRED EMBODIMENTS

Preferred embodiments of the present invention will be described with reference to the accompanying drawings.

Figure 1:
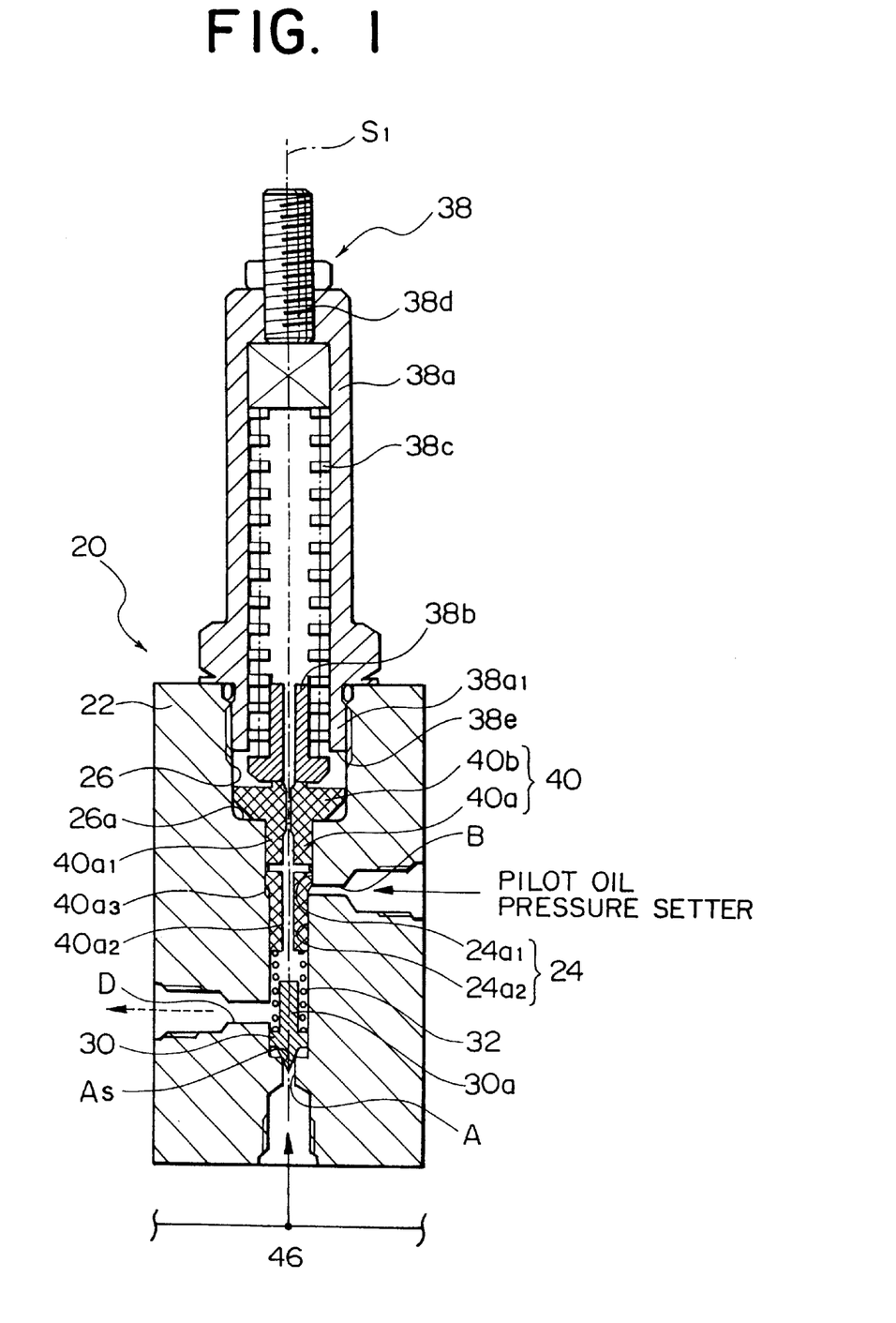
FIG. 1 is a diagram showing a pressure control valve according to the present invention.

FIG. 1 shows a relief valve 20 according to a first embodiment of the present invention.

A valve main body 22 of the relief valve 20 has formed therein a valve chamber 24 as an internal cylindrical space with its central axis extending on the axis $S_1$ and a cylinder chamber 26 as an internal cylindrical space with a larger diameter than the valve chamber 24 located adjacent to and above the valve chamber 24 with its central axis extending on the same axis $S_1$.

The valve main body 22 has further formed therein a relief port A communicating with the valve chamber 24 with its central axis extending on the axis $S_1$. The valve main body 22 has additionally formed therein a drain port D opening at a portion, near the relief port A, of the internal circumferential surface of the valve chamber 24 and a pilot port B opening at another portion, near the cylinder chamber 26, of the internal circumferential surface of the valve chamber 24. The inner diameter of the valve chamber 24 is formed such that the side where there is the cylinder chamber 26 has a large diameter $24a_1$ and the other side where there is the relief port A has a small diameter $24a_2$. The diameter of the valve chamber 24 changes at the pilot port B. The working fluid of the pressure circuit 46 flows into the relief port A.

In the valve chamber 24, there is disposed a valve plug 30 whose conical end portion is placed against the valve seat As of the relief port A, and also there is disposed a spring 32 for the valve plug pressing the valve plug 30 against the seat As. Formed at the basal end of the valve plug 30 is a cylindrical guide portion 30a for guiding the spring 32 for the valve plug by having the spring 32 for the valve plug slide along the surface thereof.

Disposed through the valve chamber 24 and the cylinder chamber 26 is a pilot piston 40 which is freely slidable in the direction of the axis $S_1$. The pilot piston 40 includes a piston barrel 40a of circular cross-section inserted in the valve chamber 24, and a piston head 40b, which is larger in diameter than the piston barrel 40a and located in the cylinder chamber 26. The pilot piston 40 has an oil hole extending along the axis $S_1$. The bottom end of the piston barrel 40a engages against the end of the spring 32 for the valve plug away from the valve plug 30.

The piston barrel 40a consists of a larger-diameter portion $40a_1$ that slides on the large-diameter wall $24a_1$ of the valve chamber 24, and a small-diameter portion $40a_2$ that slides on the small-diameter wall $24a_2$ of the valve chamber 24. Those two different-diameter portions form a pressure receptor $40a_3$.

The pilot port B is connected to a pilot oil pressure setter 44, and a pilot pressure $P_{pi}$, set at a specified pressure by the pilot oil pressure setter 44, is supplied through the pilot port B to the valve chamber 24. The pilot oil that has flowed into the valve chamber 24 acts on the pressure receptor $40a_3$ of the pilot piston 40, causing the pilot piston 40 to move up.

Meanwhile, internal threads are formed on the inner surface of the cylinder chamber 26. Engaging in the internal threads are the external threads on the outer surface of the connector portion $38a_1$ of the cylinder 38a as a component member of an initial value adjuster 38, and thus the initial value adjuster 38 is connected to the valve main body 22.

Figure 3A:
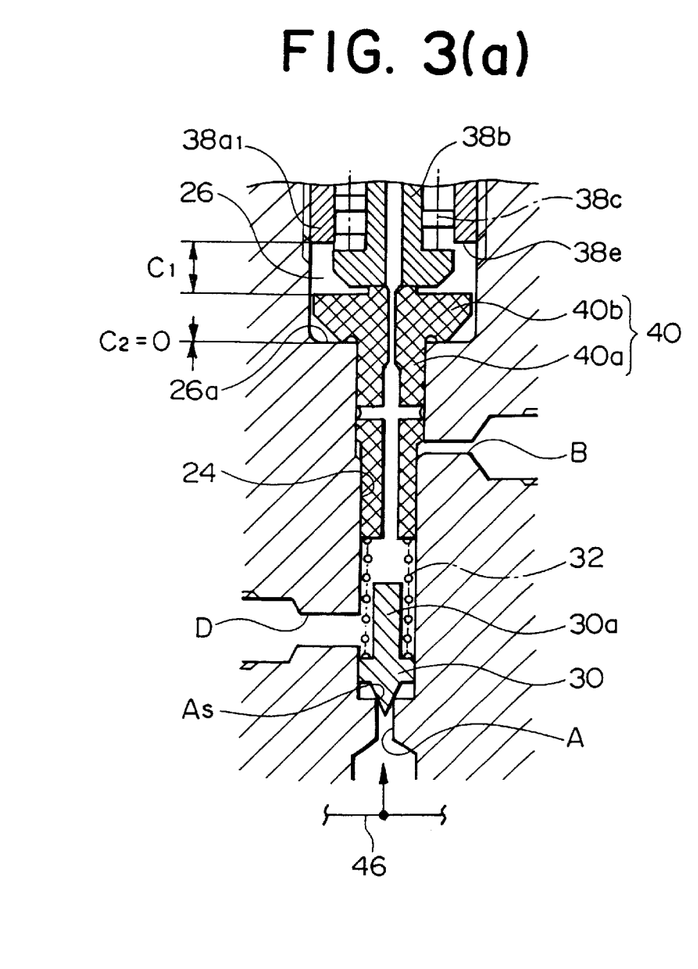
FIGS. 3(a) and 3(b) are diagrams showing a first example of arrangement of a pilot piston used in the pressure control valve according to the present invention.

The initial value adjuster 38 includes a cylinder 38a mentioned above, a piston position setting member 38b disposed in the cylinder 38a and being in contact with a piston head 40b of the pilot piston 40, an initial value adjusting spring 38c, provided with a spring constant larger than that of the spring 32 for the valve plug, for giving a specified downward spring force to the pilot piston 40 through a piston position setting member 38b, an adjust screw 38d, engaging in the internal threads formed at the top portion of the cylinder 38a, for varying the spring force of the initial value adjusting spring 38c, and an end face 38e, formed at the bottom end of the connector portion $38a_1$, for engaging with the piston head 40b to stop the upward movement of the pilot piston 40. Therefore, by adjusting the adjust screw 38d, it is possible to set the initial value of the pilot piston 40 (the position of the pilot piston when $P_{pi}$=0) in a range from a position of the pilot piston 40 at which the piston head 40b contacts the bottom face 26a of the cylinder chamber 26 ($C_1$>0 and $C_2$=0 in FIG. 3, where $C_1$ denotes the gap between the piston head 40b and the end face 38e and $C_2$ denotes the gap between the piston head 40b and the bottom face 26a) to another position of the pilot piston 40 at which the piston head 40b contacts the end face 38e ($C_1$=0 and $C_2$=max).

Figure 2:
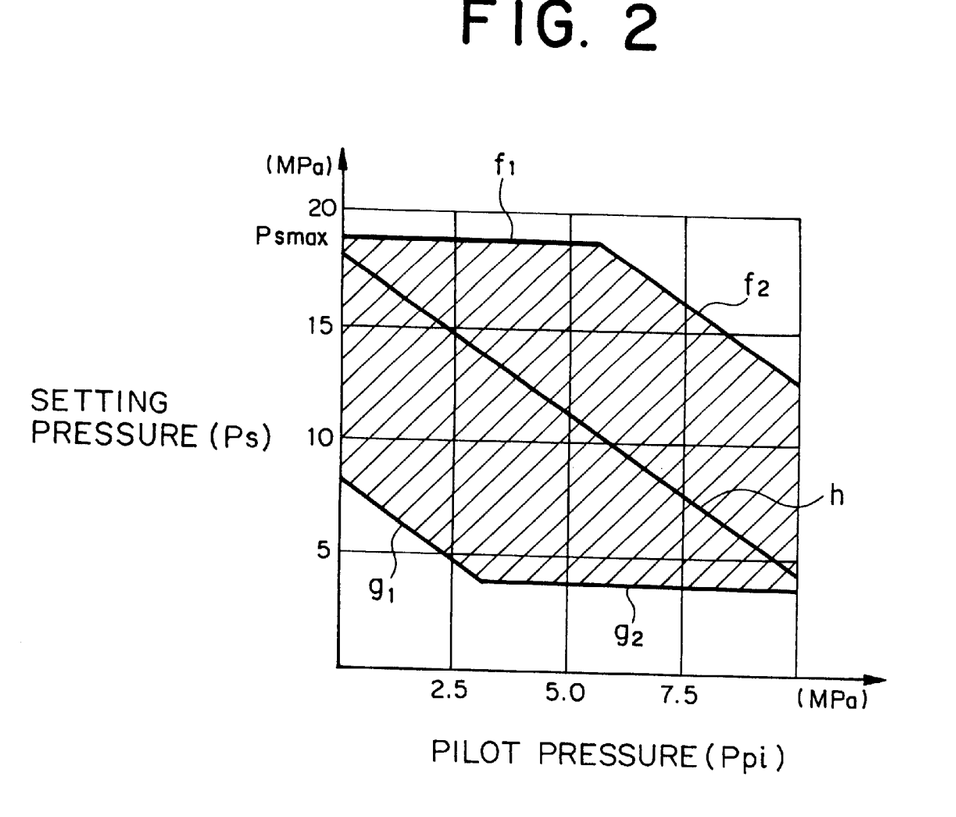
FIG. 2 is a diagram of setting pressure control when the pressure control valve according to the present invention is used.
Figure 3B:
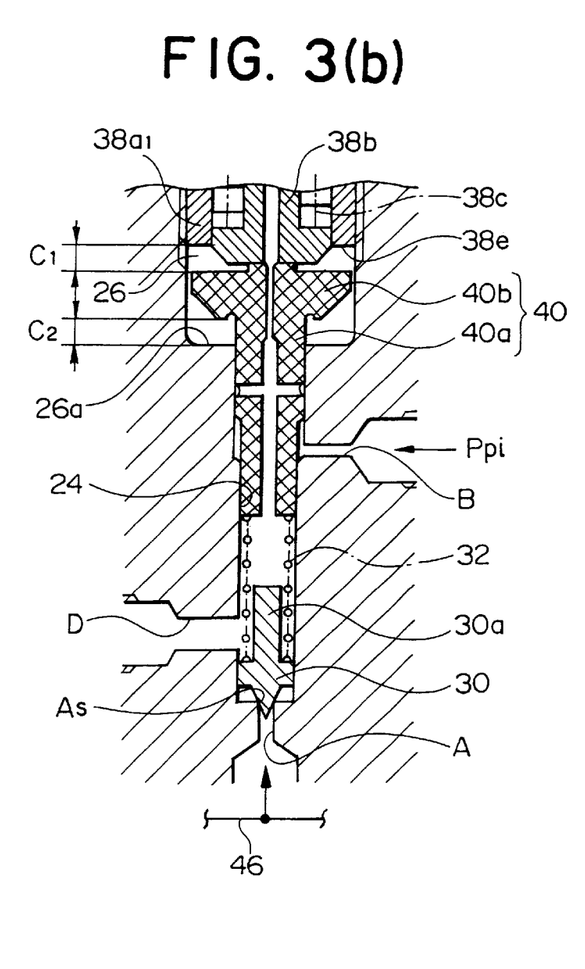
Figure 4A:
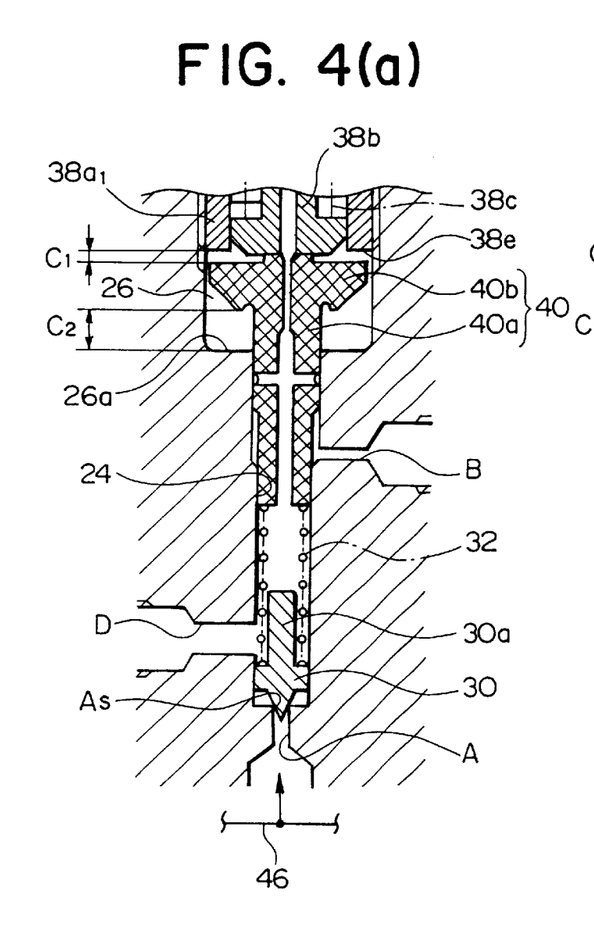
FIGS. 4(a) and 4(b) are diagrams showing a second example of arrangement of the pilot piston used in the pressure control valve according to the present invention.
Figure 4B:
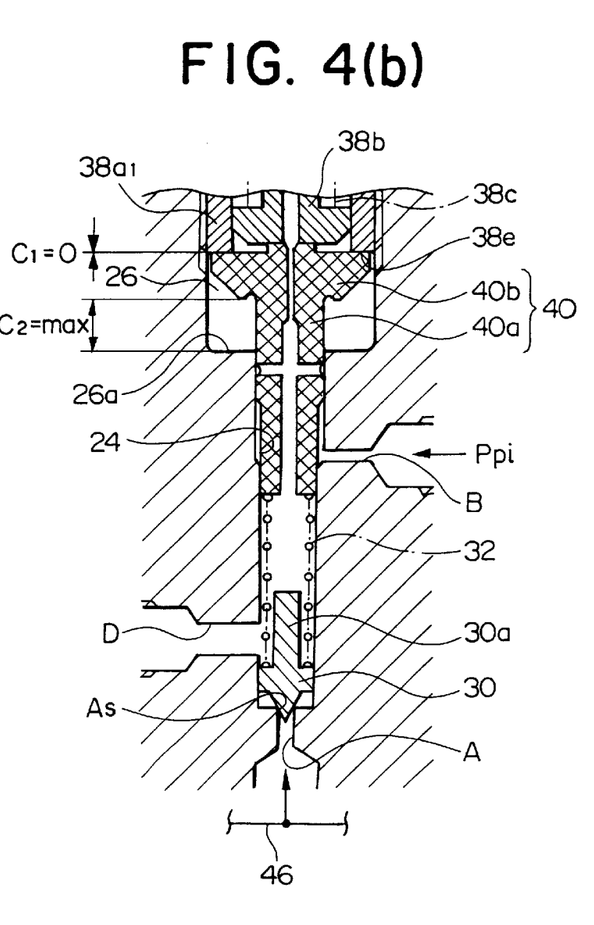
Figure 5A:
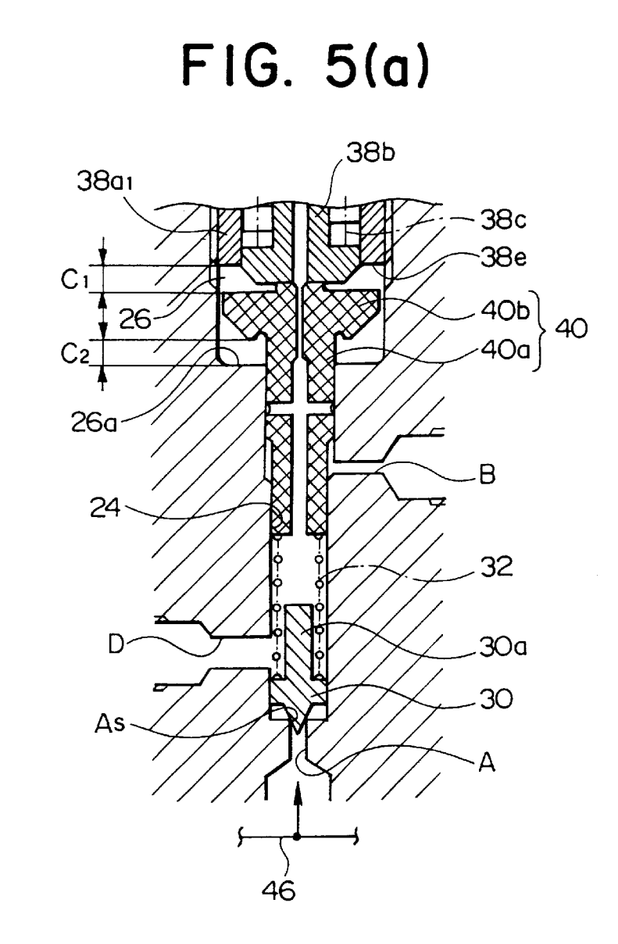
FIGS. 5(a) and 5(b) are diagrams showing a third example of arrangement of the pilot piston used in the pressure control valve according to the present invention.
Figure 5B:
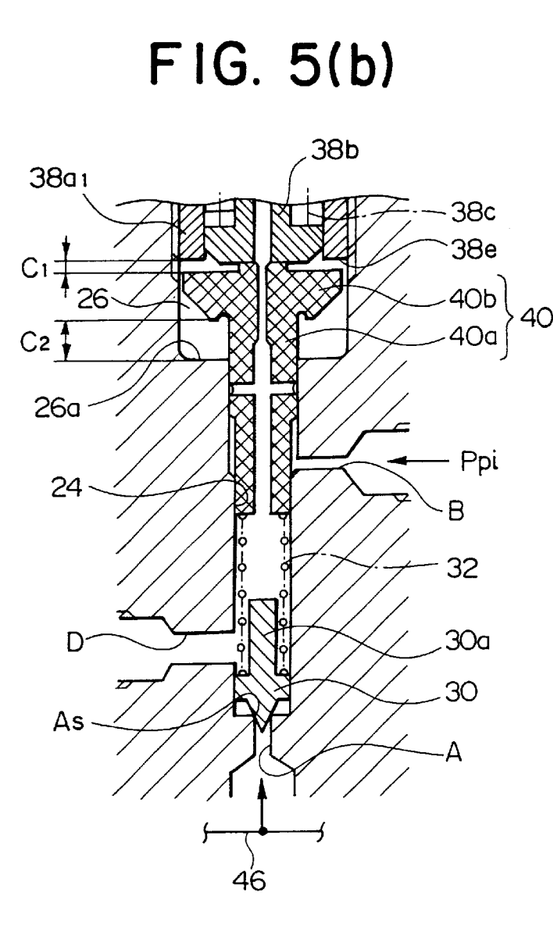

A method for setting the setting pressure Ps for the relief valve 20 according to the first embodiment of the present invention will be described with reference to the setting pressure control diagram in FIG. 2 and the diagrams of FIG. 3 to FIG. 5 showing the interior of the valve.

FIG. 3(a) shows the arrangement of the pilot piston 40 when a relief valve 20 provided with an upper limit of the setting pressure is used. In this case, by increasing the screwed-in amount of the adjust screw 38d of the initial value adjuster 38 from the condition of $C_1$>0 and $C_2$=0 (the adjust screw 38d is moved downwards), the pilot piston 40 is pushed down through the piston position setting member 38b by a large force of the initial value adjusting spring 38c, to thereby more strongly press the piston head 40b against the bottom face 26a of the cylinder chamber 26. In this process, the piston barrel 40a of the pilot piston 40 goes down to the side of the valve plug 30, so that the compressing force of the spring 32 for the valve plug becomes maximum.

With the pilot piston 40 located in this position, when the pilot pressure $P_{pi}$ is a small value, even if a small thrust of the pilot oil acts on the pilot piston 40, because the pressure of the initial value setting spring 38c is greater than this thrust, the pilot piston does not move upwards and the valve plug 30 is pressed against the seat As by a large spring force of the spring 32 for the valve plug, and thus a setting pressure upper limit $Ps_{max}$ is set.

When an increased thrust by a rise in the pilot pressure $P_{pi}$ surpasses the pressure of the initial value setting spring 38c, as shown in FIG. 3(b), the pilot piston 40 moves up ($C_1>0$ and $C_2>0$) and therefore the length of the spring 32 for the valve plug becomes longer. Consequently, the spring force of the spring 32 for the valve plug is reduced and the force pressing the valve plug 30 against the valve seat decreases and as the result, the setting pressure Ps decreases linearly.

Therefore, a setting pressure control diagram is obtained in which as indicated by solid lines $f_1$ and $f_2$, when the pilot pressure $P_{pi}$ is a small value, the setting pressure is at its upper limit $Ps_{max}$ and when the pilot pressure is higher than a specified value, the setting pressure Ps decreases linearly.

FIG. 4(a) shows the arrangement of the pilot piston 40 when a relief valve 20 provided with a lower limit of the setting pressure is used. In this case, the screwed-in amount of the adjust screw 38d of the initial value adjuster 38 is reduced (the adjust screw 38d is moved upwards), the piston position setting member 38b is moved up to a position at which there is provided the gap $C_1$ between the end face 38e of the connector portion 38a1 and the piston head 40b ($C_1>0$, $C_2>0$ and $C_1<C_2$). In this process, the piston barrel 40a of the pilot piston 40 moves up, so that the spring force of the spring 32 for the valve plug becomes smaller than in the case shown in FIG. 3(a).

With the pilot piston 40 located as mentioned above, when a pilot pressure $P_{pi}$ is supplied to the pilot port B, the pilot piston 40 is moved up by a thrust generated and the length of the spring 32 for the valve plug is increased. Consequently, the spring force of the spring 32 for the valve plug decreases and the force pressing the valve plug 30 against the seat As decreases and therefore the setting pressure Ps decreases linearly. As the pilot pressure $P_{pi}$ rises, as shown in FIG. 4(b), the piston head 40b contacts the end face 38e of the connector portion 38a1 ($C_1=0$ and $C_2=max$), with the result that the spring force of the spring 32 for the valve plug is fixed at the minimum value. Therefore, even if the pilot pressure $P_{pi}$ rises further, the valve plug 30 is pressed against the seat As by a small spring force of the spring 32 for the valve plug, so that the setting force lower limit $Ps_{min}$ is set.

Accordingly, a setting pressure control diagram can be obtained in which as shown by the solid lines $g_1$ and $g_2$ in FIG. 2, when the pilot pressure $P_{pi}$ is a small value, the setting pressure Ps decreases linearly and when the pilot pressure $P_{pi}$ is higher than a specified value, the setting pressure stays at its lower limit $Ps_{min}$. In the case as shown in FIG. 4(b), if the pilot piston 40 is arranged at its full length such that the spring 32 for the valve plug has a natural length, a setting pressure control diagram can be obtained in which the setting pressure lower limit $Ps_{min}$ is "0" Mpa.

FIG. 5(a) shows the arrangement of the pilot piston 40 when a relief valve is used which has been set such that the setting pressure Ps decreases as the pilot pressure $P_{pi}$ rises.

In this case, the relief valve 20 is set by adjusting the screwed-in amount of the initial value adjuster 38 such that $C_2>0$ and $C_1>0$ when the pilot pressure $P_{pi}=0$ and that $C_2>0$ and $C_1>0$ when the pilot pressure is at maximum $P_{pimax}$.

If the pilot piston 40 is arranged as mentioned, when a pilot pressure $P_{pi}$ of a small value is supplied and a small thrust acts on the pilot piston 40, as shown in FIG. 4(b), the pilot piston 40 moves up and the spring 32 for the valve plug is increased in length, thus reducing the force pressing the valve plug 30 against the seat As.

Thus, it is possible to obtain a setting pressure control diagram in which as the pilot pressure $P_{pi}$ increases, the setting pressure Ps decreases linearly as shown by a solid line h in FIG. 2.

The setting pressure Ps can be changed freely in the range as indicated by oblique lines by adjusting the spring force of the initial value adjusting spring 38c that acts on the pilot piston 40 by operating the initial value adjuster 38. As has been described, with this relief valve 20 according to this embodiment, by increasing or decreasing the spring force of the spring 32 for the valve plug by changing the amount of movement of the pilot piston 40 in axial direction $S_1$ by operating the initial value adjuster 38 and inputting a pilot pressure $P_{pi}$ to the pilot port B, an upper-limit setting pressure $Ps_{max}$ or a lower-limit setting pressure $Ps_{min}$ can be set, and a setting pressure Ps can be set freely in a wide range. Therefore, the oil pressure of the pressure circuit 46 can be controlled automatically and steplessly.

Because the setting pressure Ps can be set freely by a simple mechanism by which to move the pilot piston 40 in the axial direction $S_1$, the relief valve 20 can be manufactured at reduced cost.

The use of oil pressure as a pilot signal ensures safety against a fire compared with a prior-art proportional electromagnetic pressure controller using an electric pilot signal.

In this embodiment, the bottom face 26a of the cylinder chamber 26 which is contacted by the piston head 40b when it moves downwards corresponds to the first piston movement limiting means in the present invention, and the end face 38e formed at the bottom end of the connector portion 38a1 which is contacted by the piston head 40b when it moves upwards corresponds to the second piston movement limiting means in the present invention.

As described above, in the pressure control valve, when a pilot fluid flows into the pilot port, the pilot fluid moves the pilot piston in the direction of its going away from the valve plug side, and the spring force of the spring for the valve plug, which has been prolonged, is decreased, thus reducing the force pressing the valve plug against the valve seat, with the result that the pressure control valve changes its capacity to become a pressure control valve with a reduced setting pressure. Because, according to the present invention, the setting pressure can be changed freely, the fluid pressure in the pressure circuit can be controlled automatically and steplessly.

Because a fluid is used as means to give a pilot signal, the safety of the device against a fire is ensured sufficiently as compared with the conventional proportional magnetic type of pressure controller using an electric pilot signal, and its simple structure makes for the reduction of production cost.

According to the invention, the pilot piston does not move in the direction of going away from the valve plug before the pressure of the pilot fluid rises to a specified value, and a fixed large spring force presses the valve plug against the valve seat, and therefore a pressure control valve with an upper-limit setting pressure can be provided.

According to the invention, when the pressure of the pilot fluid rises above a specified value, the force pressing the valve plug against the valve seat by the spring for the valve plug becomes a fixed small force, and therefore a pressure control valve with a lower-limit setting pressure can be provided.

What is claimed is:
1. A pressure control valve comprising;
   a valve plug placed against a valve seat at a relief port connected to a pressure circuit;
   a spring for said valve plug to press said valve plug against the valve seat, said pressure control valve being capable of keeping the interior of the pressure circuit at a specified setting pressure by discharging part of the fluid when the fluid pressure in the pressure circuit surpasses the force of the spring for said valve plug, wherein the force of the spring for said valve plug is increased or decreased by the movement of a pilot piston according to an increase or decrease in the pressure of a pilot liquid, said pilot piston freely movable in the direction of expansion and compression of the spring for said valve plug being disposed at one end of the spring for said valve plug away from said valve plug, said pilot piston being provided with an adjusting spring at the other end of said pilot piston opposite the one end where there is the spring for said valve plug, and said pilot piston being so structured as to move in a direction of going away from said valve plug when said pilot piston receives a pilot fluid at a specified pressure;

a first piston movement limiting means for preventing said pilot piston, which has moved to a position closer to said valve plug, from moving said pilot piston beyond the above-mentioned closer position on the side of valve plug even if the pressing force of said adjusting spring is increased; and a second piston movement limiting means for preventing said pilot piston, which has moved to a position remote from said valve plug, from moving to a remoter position beyond the above-mentioned remote position even if the pressing force of said adjusting spring is decreased.

* * * * *